(12) United States Patent
Almkvist et al.

(10) Patent No.: US 7,124,734 B2
(45) Date of Patent: Oct. 24, 2006

(54) METHOD OF REDUCING EXHAUST GAS EMISSIONS DURING COLD START CONDITIONS AND AN INTERNAL COMBUSTION ENGINE IN WHICH THE METHOD IS USED

(75) Inventors: Goran Almkvist, Lerum (SE); Håkan Sandquist, Lerum (SE); Henrik Håkansson, Stockholm (SE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/145,453

(22) Filed: Jun. 3, 2005

(65) Prior Publication Data
US 2005/0268885 A1 Dec. 8, 2005

(30) Foreign Application Priority Data
Jun. 4, 2004 (EP) .................................. 04076646

(51) Int. Cl.
*F02B 3/02* (2006.01)
*F01L 1/34* (2006.01)

(52) U.S. Cl. ..................... 123/299; 123/90.15; 123/305

(58) Field of Classification Search ............. 123/90.11, 123/90.15, 90.17, 294, 406.47, 478, 295, 123/299, 305; 60/285
See application file for complete search history.

(56) References Cited

U.S. PATENT DOCUMENTS

| | | | |
|---|---|---|---|
| 3,714,932 A | 2/1973 | Meacham et al. | |
| 5,207,058 A | 5/1993 | Sasaki | |
| 5,253,622 A * | 10/1993 | Bornstein et al. | ........ 123/90.17 |
| 5,482,017 A | 1/1996 | Brehob et al. | |
| 6,055,948 A | 5/2000 | Shiraishi et al. | |
| 6,062,201 A * | 5/2000 | Nozawa et al. | ............. 123/478 |
| 6,394,051 B1 * | 5/2002 | Filipe et al. | ............. 123/90.15 |
| 6,405,706 B1 | 6/2002 | Hammoud et al. | |
| 6,575,129 B1 * | 6/2003 | Almkvist et al. | ........ 123/90.15 |
| 6,681,562 B1 * | 1/2004 | Allevåg et al. | ................ 60/285 |
| 6,681,741 B1 | 1/2004 | Majima et al. | |
| 6,910,449 B1 * | 6/2005 | Strom et al. | ................. 123/299 |
| 7,073,479 B1 * | 7/2006 | Kohler et al. | ............... 123/299 |
| 2003/0140877 A1 * | 7/2003 | Kramer | ................... 123/90.15 |
| 2006/0037306 A1 * | 2/2006 | Pozar et al. | .................. 60/285 |

FOREIGN PATENT DOCUMENTS

| | | |
|---|---|---|
| DE | 19740482 | 3/1999 |
| DE | 10242227 | 3/2004 |
| EP | 1186752 | 3/2002 |
| EP | 1247971 | 10/2002 |
| EP | 982489 | 10/2003 |
| EP | 11482224 | 11/2004 |

(Continued)

*Primary Examiner*—T. M. Argenbright
(74) *Attorney, Agent, or Firm*—Diana D. Brehob

(57) ABSTRACT

An internal combustion engine and a method of reducing hydrocarbon emissions of an internal combustion engine during cold start conditions in disclosed. The engine has at least one cylinder provided with a piston which reciprocates between a top dead-center and a bottom dead-center, at least one intake valve through which intake air is provided, a fuel injector assembly arranged to inject atomised fuel particles directly into the cylinder and means for controlling the opening and closing of the intake valve. According to the invention, intake valve opening is adjusted to occur after top dead center of the piston. When the intake valve opens, a pressure differential exists across the valve. Fuel is injected directly into the cylinder during the time of the pressure differential.

17 Claims, 2 Drawing Sheets

FOREIGN PATENT DOCUMENTS

| | | |
|---|---|---|
| JP | 10054287 | 2/1998 |
| JP | 2000110642 | 4/2000 |
| WO | WO 00/08328 | 2/2000 |
| WO | WO 00/57045 | 9/2000 |
| WO | WO 00/77369 | 12/2000 |
| WO | WO 01/31173 | 5/2001 |
| WO | WO 01/50015 | 7/2001 |
| WO | WO 02/075136 | 9/2002 |
| WO | WO 02/075137 | 9/2002 |

* cited by examiner

METHOD OF REDUCING EXHAUST GAS EMISSIONS DURING COLD START CONDITIONS AND AN INTERNAL COMBUSTION ENGINE IN WHICH THE METHOD IS USED

FIELD OF THE INVENTION

The invention relates to a method for reducing exhaust gas emissions of an internal combustion engine during cold start conditions. The intake valve opens after top dead center position of the piston to create a pressure drop and fuel is injected during the pressure drop.

BACKGROUND

Legislation relating to environmental protection puts an increasing restrictions on emissions from combustion engines. For this reason, modern vehicles are equipped with catalysts at which hydrocarbons are converted into water and carbon dioxide. A catalyst must have reached its operating temperature to operate efficiently. Many attempts have been made to reduce the time needed for catalysts to reach their light off temperature. Even though some of these attempts have been successful and the time needed to reach light off temperature has been reduced, starts and, in particular, cold starts are still responsible for a great proportion of total emissions of hydrocarbons from an engine. A significant reduction of emissions of hydrocarbons in the starting process of an engine would therefore generate a significant reduction of the total emissions of hydrocarbons from the engine.

Before the catalyst has reached its operating temperature, the catalyst will not convert hydrocarbons into water and carbon dioxide. It is therefore of fundamental interest to make sure that the amount of injected fuel is kept as low as possible during cold start conditions. However, it is difficult to maintain stable combustions at cold start conditions. To supply conditions that are necessary for stable combustions, normally a surplus amount of fuel is injected during cold start.

With in-cylinder (or direct) injection, an additional problem occurs during the start up phase of the engine. Direct injection engines include a high pressure pump, which operating pressure must be sufficient to atomize the injected fuel. To reach the operating pressure, the engine must run at a considerable speed. When the first injections take place, the engine speed has not been achieved yet. Therefore, the fuel is poorly atomized. To sustain stable combustion, excess fuel is injected. The operating pressure of the fuel pump during the pressure build-up phase during starting is impaired as a consequence of adding additional fuel. Reducing the amount of injected fuel, accelerates pressure build-up upon starting and reduces hydrocarbon emissions.

SUMMARY OF THE INVENTION

To overcome the slow pressure build-up in the fuel injection system during cold start, the inventors of the present invention contemplate controlling an intake valve of the engine such that it opens after a piston has passed its top dead-center position, thereby creating a pressure drop effected by the movement of the piston toward its bottom dead-center. At least a portion of the fuel is injected during the period of pressure differential across the intake valve after the intake valve is opened.

By opening the intake valve late, that is after the piston has passed its top dead center position, an expansion of the combustion chamber takes place while the intake valve is closed. When opening the intake valve, the intake air enters into the combustion chamber under high velocity, even up to sonic conditions. Thus, the air enters into the cylinder at a velocity equal to the speed of sound. The high velocity enhances mixing of the fuel and supports breaking up the injected fuel droplets into smaller particles. Furthermore, by injecting fuel during the pressure drop, a larger pressure difference between the in-cylinder pressure and the pressure inside the injector exists. This increase in pressure difference mitigates the problem that the injector assembly has not yet reached its operating pressure.

According to a preferred embodiment of the invention, the fuel injection is divided into a main injection and at least one supplementary injection. A main part of the main injection takes place during the pressure drop and a supplementary injection takes place immediately before ignition takes place. By arranging a supplementary injection immediately before the ignition takes place it is possible to stabilize the combustion. Since the injection is positioned in time immediately before the ignition takes place, a local area of a rich air fuel mixture will be present at the spark plug. Using a supplementary injection facilitates stable combustion while having a total air fuel mixture in the combustion chamber, which is lean.

By providing a supplementary late injection, it is possible to delay ignition. Preferably, the combustion timing is retarded, such that 50% of the heat release occurs between 45° and 135° after a top dead center position of a piston arranged in the cylinder. Late combustion contributes to the reduction of hydrocarbon emissions during cold start for the following reasons. When the combustion takes place at a late stage, a larger portion of the combustion can take place with an open exhaust valve. This leads to a greater heat release to the catalytic converter in the exhaust channel, which in turn leads to that catalyst reaching its light off temperature more quickly. Furthermore, a larger portion of the cylinder walls are exposed to the flame. The amount of residual fuel adhered to the cylinder walls, which may be scraped off during the scavenging of the exhaust from the cylinder, is thereby correspondingly reduced.

According to a further preferred embodiment, the engine operates at high load during the cold start condition and at a high idling speed. By controlling the engine such that it works under high load, condensed fuel on the walls will have little effect on the mixing ratio between the air and the fuel, thereby resulting in that the lambda value of the air fuel mixture contained in the cylinder remains substantially constant. Under the condition of high load a high pressure is generated in the intake manifold. The high pressure counteracts a back flow into the manifold when the intake valve is open. Therefore, wall wetting in the intake manifold will be reduced. Pressure differences in the intake manifold during the operation of the engine will not give rise to large variations in lambda value, which may occur if a flow back from the cylinder into the intake manifold takes place, which flow back would lead to that fuel condensing at the walls of the intake manifold (wall wetting).

BRIEF DESCRIPTION OF DRAWINGS

The invention will be described in further detail below, with references to appended drawings, where.

DETAILED DESCRIPTION

Figure 1:
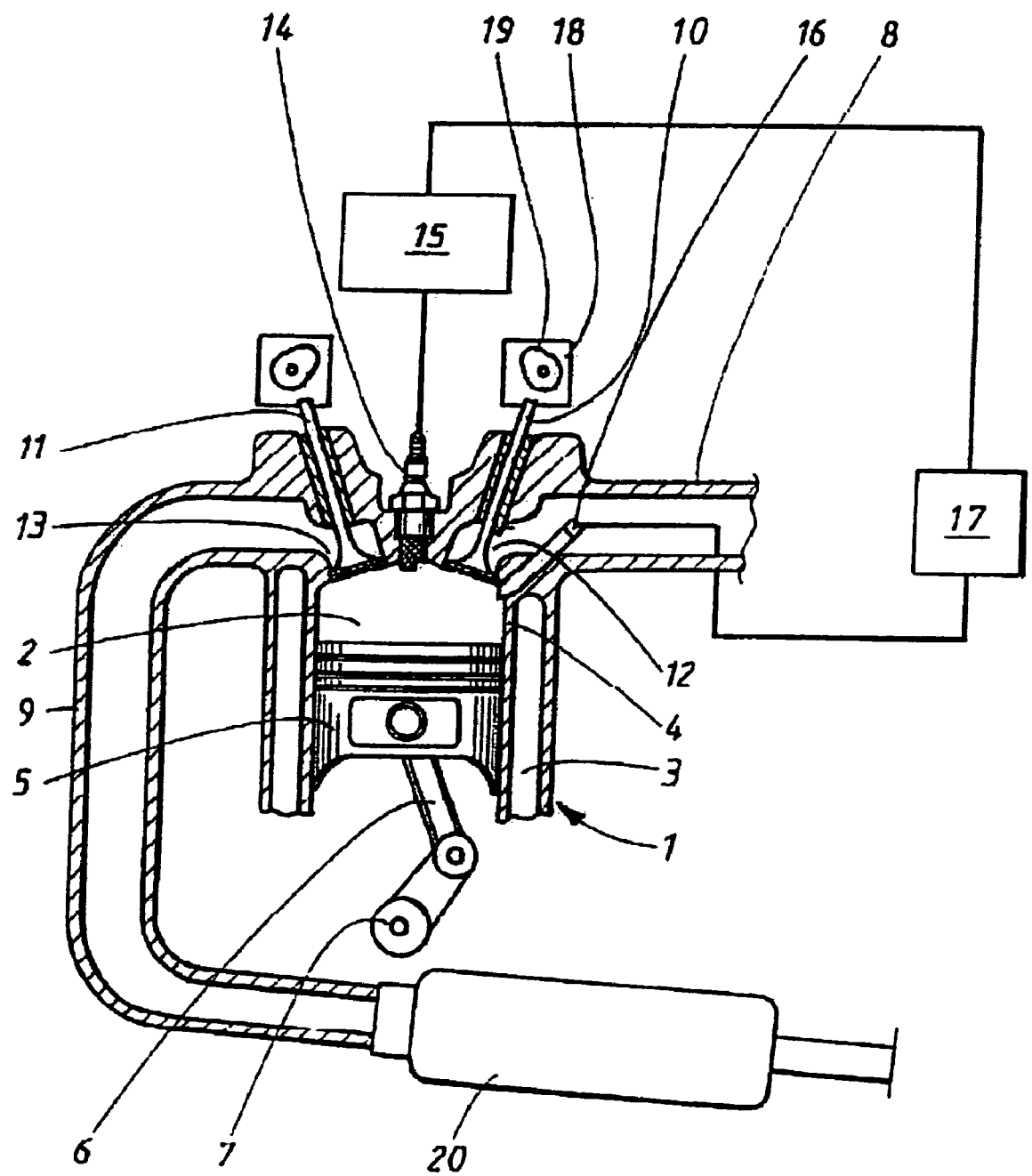
FIG. 1 schematically shows an internal combustion engine in which the inventive method is used.

FIG. 1 show a spark ignition internal combustion engine. Engine 1 includes a set of combustion chambers 2, one of which is shown in the figure, formed in a cylinder block 3. The combustion chamber 2 is formed by a cylinder bore 4 in which a piston 5 is mounted. A connecting rod 6 transfers a reciprocating movement of the piston 5 into a rotational movement of a crank shaft 7.

The engine is further equipped with an intake conduit 8 and an exhaust conduit 9. The gas flow through the combustion chamber 2 is controlled by at least one intake valve 10 and at least one exhaust valve 11 arranged at an intake port 12 and exhaust port 13 providing a connection between the intake conduit 8 and the combustion chamber 2 respective between the combustion chamber 2 and the exhaust conduit.

Furthermore, the combustion chamber 2 is provided with ignition means 14 in the form of a spark plug which timing is controlled by an ignition system 15.

Fuel is injected by a fuel injector assembly 16, which is arranged to inject the fuel directly in the combustion chamber. The fuel injector assembly is controlled in a conventional manner by an engine control unit 17. The fuel injector assembly is of a conventional nature and is arranged for injecting fuel directly into the cylinder. For this purpose, the fuel injector assembly may comprise a low and a high pressure fuel pump and an injector.

Opening and closing of the intake valve is controlled by means for controlling 18 the opening and closing of the intake valve. The means 18 for controlling the intake valve may be constituted by a variable cam shaft 19 or by an electromechanically controlled actuator. Furthermore a multilobe cam shaft may be used where alternative cam lobes exist for different operating conditions. The means 18 for opening and closing of the intake valve has at least one operational mode which is adapted to cold start conditions. By cold start conditions is meant operational conditions which exist prior to a catalyst 20 arranged in the exhaust conduit 9 has reached its light off temperature.

Figure 2:
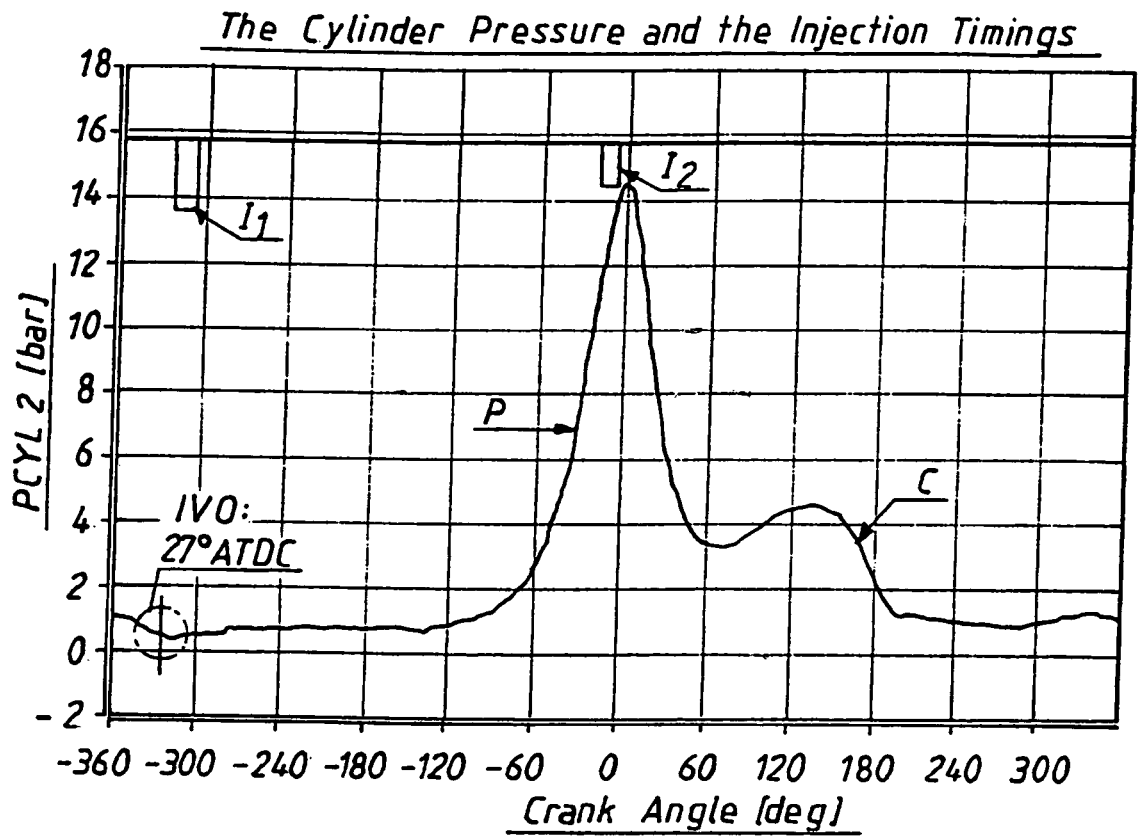
FIG. 2 shows a diagram representing the pressure as a function of crank angle position.

In FIG. 2, a diagram representing the pressure as a function of crank angle position is shown. The intake valve opens at a late stage preferably between 5 and 45° after top dead center, preferably between 20–35° after top dead center. A main part of first main injection, $I_1$, takes place during the pressure drop which is created due to the late opening of the intake valve. Preferably the main injection takes place during the pressure drop. A second supplementary injection, $I_2$, may be injected immediately prior to the ignition take place. Immediately prior means occurring at such a late stage that a rich local fuel-air mixture is present around the spark plug at the time of ignition.

The pressure, P, increases during the compression phase to create a pressure peak. Due to late ignition, the pressure peak created by the combustion is delayed and small in magnitude. The ignition is preferably delayed to the extent that the point in time where 50% of the heat released in the combustion process in the cylinder occurs in an interval between 45° and 135° after a top dead center position of a piston arranged in the cylinder. The late combustion contribute to the reduction of hydrocarbon emissions during cold start as have been explained above.

Figure 3:
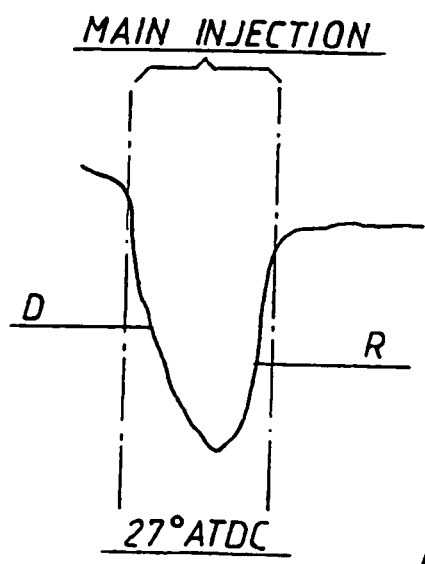
FIG. 3 shows an enlarged portion of the diagram in FIG. 2, where a pressure drop is generated by late opening of the intake valve.

According to the invention, the intake valve is controlled such that it opens after the piston has passed top dead-center, thereby creating a pressure drop effected by the movement of the piston toward its bottom dead-center before opening of the intake valve. In FIG. 3, a sharp fall in pressure D occurs due to late opening of the intake valve. The intake valve should preferably be opened between 5–45° after top dead center, more preferably between 20–35° after top dead center. When the intake valve has opened, air enters the cylinder at high velocity, thereby creating the pressure drop. After a period of falling pressure, the air flow into the cylinder gives rise to an increased pressure during a phase R when the pressure difference over the intake valve has levelled out. The term pressure drop is used for both the period with a sharply decreased pressure, D, and the phase R with increasing pressure which extends until the pressure drop across the intake valve is insignificant.

Furthermore, according to the invention, the fuel injector assembly 16 is arranged for injecting at least part of the fuel during this pressure drop as has been indicated in FIG. 3. Preferably, a main part of the main injection takes place during the pressure drop.

According to a preferred embodiment of the invention, a second supplementary injection $I_2$ may be injected immediately prior to the ignition take place. This second supplementary injection contributes to a stable combustion as makes it possible to further delay the combustion, which in turn contributes to a larger heat release to the catalyst.

In a preferred embodiment the main injection amount to 70–95% of the total amount of injected fuel into the cylinder. Preferably, the whole content of the main injection is injected during the pressure drop.

To further reduce hydrocarbon emissions before the catalyst has reached its light off temperature, a cold start is preferably performed with the fuel injector assembly controlled so as to inject a total amount of fuel corresponding to a lean air-fuel mixture in the cylinder. A suitable lambda value is 1.1.

Preferably, the internal combustion engine is controlled to maintain a high idle speed for a period of time during cold start conditions. A suitable idle speed is around 1500 rpm and is typically in the interval 1000–2000 rpm depending on engine type. A 4-cylinder engine typically has an idle speed exceeding 1500 rpm, a 6-cylinder engine typically has an idling speed exceeding 1200 rpm and an 8 cylinder engine typically has an idle speed exceeding 1000 rpm. The high load is maintained as long as the cold start conditions remain, i.e., until the catalyst has reached its light off temperature.

The invention can be used on naturally aspirated engines as well as pressure charged engines.

The invention claimed is:

1. A method of operating an internal combustion engine during cold start comprising:
   opening an intake valve after a piston has passed its top dead center position, said engine having at least one cylinder, each of said cylinders further having a reciprocating piston, an intake valve through which intake air is provided, and a fuel injector assembly arranged to inject atomized fuel particles directly into said cylinder;
   injecting fuel in a first fuel injection occurring immediately after said opening; and
   injecting fuel in a second fuel injection just prior to an ignition event.

2. The method of claim 1 wherein said opening creates a pressure drop in said cylinder by a movement of said piston as it moves towards its bottom dead center position, said opening causes a pressure drop to occur across said intake valve, and said first fuel injection occurs during said pressure drop across said intake valve.

3. The method of claim 1 wherein said first fuel injection comprise 70–95% of the total amount of fuel injected into the cylinder.

4. The method of claim 1 wherein a fuel-air mixture in said cylinder after said second fuel injection is a lean air-fuel mixture.

5. The method of claim 4 wherein a fuel-air mixture in said cylinder after said second fuel injection has a lambda value of approximately 1.1.

6. The method of claim 1, further comprising: maintaining a high idle speed during a cold start.

7. The method of claim 6 wherein the said idles speed is in the range of 1000–2000 rpm.

8. The method of claim 1, further comprising: retarding ignition timing such that the 50% heat released time occurs between 45 and 135 degrees after top dead center of the piston.

9. An internal combustion engine, comprising:
   a cylinder;
   a piston adapted to reciprocate in said cylinder between a top dead center position and a bottom dead center position;
   at least one intake valve coupled to said cylinder;
   a fuel injector assembly coupled to said cylinder;
   an intake valve control means for controlling the opening and closing of said intake valve; and
   an engine control unit coupled to said intake valve control means and said fuel injector assembly wherein said engine control unit commands said intake valve to open after top dead center of said piston and commands said fuel injector assembly to inject fuel shortly after valve opening in a first fuel injection and wherein said to inject another amount of fuel shortly before a firing of said spark in a second fuel injection.

10. The engine of claim 9 wherein after opening said intake valve, a pressure differential exists across said intake valve for a short period of time and said first fuel injection occurs during such time of pressure differential.

11. The engine of claim 9 wherein said intake valve control means comprises a variable cam timing device.

12. The engine of claim 9 wherein said intake valve control means comprises electronic valve actuation.

13. The engine of claim 9 wherein said intake valve control means comprises a camshaft having at least two lobes adapted to actuate said intake valve wherein one of said two lobes causes an intake valve opening time after to occur after top dead center and said camshaft is coupled to the engine and actuates said intake valve.

14. The engine of claim 9 wherein lambda of an air-fuel mixture in said cylinder at the time of spark firing is approximately 1.1.

15. The engine of claim 9 wherein an idle speed of the engine is in the range of 1000–2000 rpm.

16. An internal combustion engine, comprising:
   a cylinder;
   a piston adapted to reciprocate in said cylinder between a top dead center position and a bottom dead center position;
   at least one intake valve coupled to said cylinder;
   a fuel injector assembly coupled to said cylinder;
   an intake valve control means for controlling the opening and closing of said intake valve;
   an engine control unit coupled to said intake valve control means and said fuel injector assembly wherein said engine control unit commands said intake valve to open after top dead center of said piston and commands said fuel injector assembly to inject fuel shortly after said valve opening; and
   a spark plug coupled to said cylinder and electronically coupled to said engine control unit, said electronic control unit commanding said spark to fire such that 50% of the heat released of combustion occurs between 70 and 110 degrees after top dead center of said piston.

17. The engine of claim 16 wherein said intake valve control means comprises a variable cam timing device.

* * * * *